(12) United States Patent
Takesue et al.

(10) Patent No.: US 10,960,389 B2
(45) Date of Patent: Mar. 30, 2021

(54) EXHAUST GAS PURIFICATION CATALYST

(71) Applicant: CATALER CORPORATION, Shizuoka (JP)

(72) Inventors: Yuki Takesue, Shizuoka (JP); Kyosuke Murakami, Shizuoka (JP); Ryota Onoe, Shizuoka (JP)

(73) Assignee: CATALER CORPORATION, Shizuoka (JP)

( * ) Notice: Subject to any disclaimer, the term of this patent is extended or adjusted under 35 U.S.C. 154(b) by 188 days.

(21) Appl. No.: 16/303,338

(22) PCT Filed: May 12, 2017

(86) PCT No.: PCT/JP2017/018077
§ 371 (c)(1),
(2) Date: Nov. 20, 2018

(87) PCT Pub. No.: WO2017/204008
PCT Pub. Date: Nov. 30, 2017

(65) Prior Publication Data
US 2020/0316579 A1  Oct. 8, 2020

(30) Foreign Application Priority Data

May 24, 2016  (JP) .............................. JP2016-103467

(51) Int. Cl.
*B01J 23/10* (2006.01)
*B01J 23/44* (2006.01)
(Continued)

(52) U.S. Cl.
CPC ........... *B01J 37/0244* (2013.01); *B01J 23/63* (2013.01); *B01J 35/0006* (2013.01); *F01N 3/10* (2013.01);
(Continued)

(58) Field of Classification Search
CPC . B01J 23/10; B01J 23/44; B01J 23/464; B01J 23/63; B01J 35/0006; B01J 35/04; F01N 3/10
See application file for complete search history.

(56) References Cited

U.S. PATENT DOCUMENTS 5,597,771 A * 1/1997 Hu ........................ F01N 3/101
502/304
5,753,580 A * 5/1998 Hayashi ................... B01J 23/63
502/304
(Continued)

FOREIGN PATENT DOCUMENTS

CN    1197686 A    11/1998
CN    1271618 A    11/2000
(Continued)

OTHER PUBLICATIONS

Office Action for Indian Patent Application No. 201827044249, dated Sep. 25, 2019.
(Continued)

*Primary Examiner* — Cam N. Nguyen
(74) *Attorney, Agent, or Firm* — Occhiuti & Rohlicek LLP

(57) ABSTRACT

An exhaust gas purification catalyst of the present invention is provided with a base 10 and a catalyst coat layer 30. The catalyst coat layer is provided with Rh and Pd as noble metal catalysts. Herein Rh is disposed in a first-stage upper layer A and a second-stage upper layer C, and Pd is disposed in the first-stage upper layer A and a first-stage lower layer B, and in a second-stage lower layer D. A mass ratio ($A_{Pd}/A_{Rh}$) of Pd to Rh, disposed in first-stage upper layer A is $0.5 \leq (A_{Pd}/A_{Rh}) \leq 3$.

18 Claims, 6 Drawing Sheets

(51) Int. Cl.
*B01J 23/63* (2006.01)
*B01J 35/00* (2006.01)
*B01J 35/04* (2006.01)
*F01N 3/10* (2006.01)
*B01J 37/02* (2006.01)

(52) U.S. Cl.
CPC .. *F01N 2370/02* (2013.01); *F01N 2510/0684* (2013.01)

(56) References Cited

U.S. PATENT DOCUMENTS

| | | | | |
|---|---|---|---|---|
| 5,948,723 | A * | 9/1999 | Sung | B01J 35/0006 502/303 |
| 5,980,843 | A | 11/1999 | Silversand | |
| 6,080,375 | A | 6/2000 | Mussmann et al. | |
| 6,087,298 | A * | 7/2000 | Sung | B01D 53/9477 502/333 |
| 6,294,140 | B1 | 9/2001 | Mussmann et al. | |
| 7,517,510 | B2 * | 4/2009 | Chen | B01D 53/945 423/213.2 |
| 7,550,124 | B2 * | 6/2009 | Chen | B01J 37/0248 423/213.2 |
| 7,758,834 | B2 * | 7/2010 | Chen | B01J 37/0248 423/213.2 |
| 8,158,552 | B2 * | 4/2012 | Hori | B01D 53/945 502/304 |
| 8,168,560 | B2 * | 5/2012 | Taki | B01J 23/40 502/304 |
| 8,309,488 | B2 * | 11/2012 | Kitamura | B01D 53/945 502/326 |
| 8,323,599 | B2 * | 12/2012 | Nunan | B01D 53/9477 423/213.2 |
| 8,337,791 | B2 * | 12/2012 | Kohara | B01J 23/40 423/213.2 |
| 8,394,348 | B1 * | 3/2013 | Nunan | B01D 53/9472 423/213.2 |
| 8,501,661 | B2 * | 8/2013 | Sunada | B01D 53/945 502/325 |
| 8,551,908 | B2 * | 10/2013 | Satou | B01D 53/945 502/327 |
| 8,557,204 | B2 * | 10/2013 | Nunan | B01J 23/464 423/213.5 |
| 8,580,705 | B2 * | 11/2013 | Aoki | B01D 53/945 502/304 |
| 8,603,940 | B2 * | 12/2013 | Segawa | F01N 3/10 502/325 |
| 8,663,588 | B2 * | 3/2014 | Lindner | B01J 37/0244 423/213.5 |
| 8,796,172 | B2 * | 8/2014 | Chinzei | B01J 23/002 502/327 |
| 8,853,120 | B2 * | 10/2014 | Aoki | B01J 35/0006 502/303 |
| 8,906,330 | B2 * | 12/2014 | Hilgendorff | B01J 23/40 423/213.5 |
| 8,968,690 | B2 * | 3/2015 | Nunan | B01J 23/42 423/213.5 |
| 9,174,198 | B2 * | 11/2015 | Kawabata | B01D 53/945 |
| 9,433,927 | B2 * | 9/2016 | Ikeda | B01J 37/04 |
| 9,440,223 | B2 * | 9/2016 | Aoki | B01D 53/945 |
| 9,522,360 | B2 * | 12/2016 | Schmidt | B01D 53/945 |
| 9,597,660 | B2 * | 3/2017 | Aoki | B01J 37/0244 |
| 9,616,410 | B2 * | 4/2017 | Okada | F01N 3/2807 |
| 9,873,085 | B2 * | 1/2018 | Yoshida | B01J 23/42 |
| 9,937,487 | B2 * | 4/2018 | Miura | B01J 35/0006 |
| 9,999,871 | B2 * | 6/2018 | Aoki | B01J 35/04 |
| 10,010,873 | B2 * | 7/2018 | Aoki | B01J 35/0006 |
| 10,125,649 | B2 * | 11/2018 | Onoe | F01N 3/022 |
| 10,150,082 | B2 * | 12/2018 | Yoshikawa | B01J 37/0244 |
| 10,213,741 | B2 * | 2/2019 | Sato | B01J 37/0244 |
| 10,688,476 | B2 * | 6/2020 | Onoe | B01J 37/0236 |
| 2002/0061816 | A1 | 5/2002 | Uenishi et al. | |
| 2003/0061860 | A1 | 4/2003 | Hu et al. | |
| 2009/0175773 | A1 | 7/2009 | Chen et al. | |
| 2012/0128558 | A1 | 5/2012 | Nunan et al. | |
| 2014/0357480 | A1 | 12/2014 | Aoki | |
| 2016/0121267 | A1 | 5/2016 | Schoenhaber et al. | |
| 2016/0199815 | A1 | 7/2016 | Hoshino et al. | |
| 2016/0199816 | A1 | 7/2016 | Matsueda et al. | |

FOREIGN PATENT DOCUMENTS

| | | |
|---|---|---|
| CN | 103182305 | 7/2013 |
| CN | 103201018 A | 7/2013 |
| CN | 105517705 A | 4/2016 |
| JP | 2000-510761 | 8/2000 |
| JP | 2002172325 A | 6/2002 |
| JP | 2003-112049 | 4/2003 |
| JP | 2005-506900 | 3/2005 |
| JP | 2008-246344 | 10/2008 |
| JP | 2011-183319 | 9/2011 |
| JP | 2012-040547 | 3/2012 |
| JP | 2013-136032 | 7/2013 |
| JP | 2014-509242 | 4/2014 |
| WO | WO97/43035 | 11/1997 |
| WO | WO03/035256 | 5/2003 |
| WO | 2012069405 A1 | 5/2012 |
| WO | WO2012/069405 | 5/2012 |
| WO | WO2013/099251 | 7/2013 |
| WO | WO2014/195196 | 12/2014 |
| WO | WO2015/087871 | 6/2015 |
| WO | WO2015/087872 | 6/2015 |

OTHER PUBLICATIONS

Extended Search Report for European Application No. 17802602.7 dated Feb. 12, 2019.
Chinese Office Action dated Nov. 2, 2020 in CN Application No. 201780032369.2.

* cited by examiner

EXHAUST GAS PURIFICATION CATALYST

CROSS REFERENCE TO RELATED APPLICATIONS

This application is a National Stage of International Application No. PCT/JP2017/018077 filed on May 12, 2017, which claims priority to Japanese Application No. 2016-103467 filed on May 24, 2016, the contents of which are hereby incorporated by reference in their entirety.

TECHNICAL FIELD

The present invention relates to an exhaust gas purification catalyst. More particularly, the present invention relates to an exhaust gas purification catalyst provided with a base and a catalyst coat layer formed on the surface of the base.

The present application claims priority to Japanese Patent Application No. 2016-103467 filed on May 24, 2016, the entire contents whereof are incorporated herein by reference.

BACKGROUND ART

Three-way catalysts containing at least one noble metal from among Pt (platinum), Pd (palladium) and Rh (rhodium) are often used in order to purify exhaust gas emitted by an internal combustion engine such as an automobile engine. In a typical configuration of such three-way catalysts, a catalyst coat layer composed of alumina is formed on the surface of a high heat-resistant ceramic base, and one or two or more noble metals from among Pt, Pd and Rh is supported on the catalyst coat layer. Through the concomitant use of Pt, Pd and Rh it becomes possible to efficiently purify collectively harmful components in exhaust gas.

In order to purify components in exhaust gas efficiently using such a three-way catalyst, an air-fuel ratio, i.e., the mixing ratio of air and gasoline that are supplied to the engine, is preferably close to a theoretical (stoichiometric) air-fuel ratio. Conventionally, Ce-containing oxides (for instance ceria-zirconia complex oxides) having oxygen storage capacity (OSC) have been widely used as a carrier of the noble metal, for the purpose of mitigating atmosphere variations in air-fuel ratio at which the catalyst works effectively (see for instance Patent Literature 1 to 3). The Ce-containing oxide works by storing oxygen from the exhaust gas when the air-fuel ratio of the exhaust gas is lean (i.e. oxygen excess atmosphere), and by releasing the stored oxygen when the air-fuel ratio in the exhaust gas is rich (i.e. fuel excess atmosphere). As a result, a stable catalyst performance is obtained even upon fluctuation of the oxygen concentration in the exhaust gas, and the purification performance of the catalyst is enhanced.

Exhaust gas purification catalysts have been developed in recent years, with a view to further improving the performance thereof, in which noble metal catalysts are not all supported in one carrier layer; instead, the catalyst coat layer is formed as a multilayer structure having at least two layers vertically, such that Pd is supported separately in one of the layers and Rh is supported separately in the other layer. For instance, Patent Literature 1 discloses an exhaust gas purification catalyst that contains Pd in a lower layer and contains Rh in an upper layer.

CITATION LIST

Patent Literature

Patent Literature 1: Japanese Translation of PCT Application No. 2005-506900

Patent Literature 2: Japanese Patent Application Publication No. 2003-112049

Patent Literature 3: Japanese Patent Application Publication No. 2011-183319

SUMMARY OF INVENTION

Technical Problem

Generally, exhaust gas purification catalysts have a drawback in that when exhaust gas temperature is not high yet, for instance immediately after engine start-up, the purification performance of the catalyst is likewise low, since the catalyst has not warmed up sufficiently. In particular, a large amount of HC, being unburned substances of fuel, is present in the exhaust gas at low temperature; accordingly, exhaust gas purification catalysts are demanded that allow bringing out good HC purification performance in a low-temperature state immediately after engine start-up. There is likewise a demand for exhaust gas purification catalysts having good high-SV (Space Velocity) performance and that can deliver good purification performance also when the flow rate of exhaust gas is high.

It is an object of the present invention, arrived at in the light of the above considerations, to provide an exhaust gas purification catalyst having a catalyst coat layer that has a multilayer structure type, the exhaust gas purification catalyst exhibiting excellent warm-up performance and good high-SV performance.

Solution to Problem

The inventors speculated that in an exhaust gas purification catalyst provided with a catalyst coat layer of multilayer structure type in which Pd is disposed in a lower layer and Rh is disposed in an upper layer, the warm-up performance of the catalyst may be increased by causing some of Pd disposed on the upstream side of the lower layer (first-stage lower layer) to move to the upstream side of the upper layer (first-stage upper layer). Further, the inventors found that both warm-up performance and high-SV performance can be realized at a high level by properly prescribing a mass ratio of Pd to Rh, disposed in the first-stage lower layer, and perfected the present invention on the basis of that finding.

Specifically, the exhaust gas purification catalyst provided by the present invention is an exhaust gas purification catalyst which is disposed in an exhaust passage of an internal combustion engine and which purifies exhaust gas emitted by the internal combustion engine, the exhaust gas purification catalyst including a base, and a catalyst coat layer formed on a surface of the base. The catalyst coat layer is provided with Rh and Pd as noble metal catalysts, and with an OSC material having oxygen storage capacity. The catalyst coat layer is provided with a first-stage coat layer positioned upstream and a second-stage coat layer positioned downstream, in the direction of exhaust gas flow. The first-stage coat layer is provided with a first-stage lower layer formed on the base and with a first-stage upper layer formed on the first-stage lower layer. The second-stage coat layer is provided with a second-stage lower layer formed on the base and a second-stage upper layer formed on the second-stage lower layer. The Rh is disposed in the first-stage upper layer of the first-stage coat layer and in the second-stage upper layer of the second-stage coat layer. The Pd is disposed in the first-stage upper layer and the first-stage lower layer of the first-stage coat layer, and in the second-stage lower layer of the second-stage coat layer. A mass ratio ($A_{Pd}/A_{Rh}$) of Pd to Rh, disposed in the first-stage upper layer, is $0.5 \leq (A_{Pd}/A_{Rh}) \leq 3$. Such an exhaust gas purification catalyst allows achieving both warm-up performance and high-SV performance at a higher level.

In a preferred aspect of the exhaust gas purification catalyst disclosed herein, a mass ratio of Pd to Rh, disposed in the first-stage coat layer, and a mass ratio of Pd to Rh, disposed in the second-stage coat layer, are identical. The effect of enhancing warm-up performance and the effect of increasing high-SV performance can be brought out more suitably by evening out thus the overall Pd/Rh mass ratio between the first-stage coat layer and the second-stage coat layer.

In a preferred aspect of the exhaust gas purification catalyst disclosed herein, a mass ratio ($A_{Pd}/B_{Pd}$) of Pd disposed in the first-stage upper layer with respect to Pd disposed in the first-stage lower layer is $0.1 \leq (A_{Pd}/B_{Pd}) \leq 0.7$. In such a configuration, the ratio of Pd disposed in the first-stage upper layer and Pd disposed in the first-stage lower layer strikes an appropriate balance, and hence warm-up performance and high-SV performance can be achieved at a higher level.

In a preferred aspect of the exhaust gas purification catalyst disclosed herein, a mass ratio ($D_{Pd}/C_{Rh}$) of Pd disposed in the second-stage lower layer with respect to Rh disposed in the second-stage upper layer is $5 \leq (D_{Pd}/C_{Rh}) \leq 10$. In such a configuration, the ratio of Pd and Rh in the catalyst coat layer as a whole strikes an appropriate balance, and hence the effect of enhancing warm-up performance and the effect of increasing high-SV performance can be brought out more suitably.

In a preferred aspect of the exhaust gas purification catalyst disclosed herein, the OSC material is composed of $CeO_2$ or a $CeO_2$—$ZrO_2$ complex oxide. Both $CeO_2$ and $CeO_2$—$ZrO_2$ complex oxides have high OSC capacity, and are preferably utilized as the OSC material used in the exhaust gas purification catalyst disclosed herein.

In a preferred aspect of the exhaust gas purification catalyst disclosed herein, the OSC material is disposed in at least the first-stage upper layer. A mass ratio ($A_{Pd}/A_{Ce}$) of Pd to $CeO_2$, disposed in the first-stage upper layer, is $0.01 \leq (A_{Pd}/A_{Ce}) \leq 0.6$. Such a configuration allows achieving an optimal exhaust gas purification catalyst having an improved balance between warm-up performance and high-SV performance.

In a preferred aspect of the exhaust gas purification catalyst disclosed herein, the first-stage coat layer is formed in a portion, of the base, corresponding to at least 20% of the length of the base, from an end of the base on an exhaust gas inlet side towards an exhaust gas outlet side. The second-stage coat layer is formed in a portion, of the base, corresponding to at least 50% of the length of the base, from an end of the base on the exhaust gas outlet side towards the exhaust gas inlet side. Enhancement of warm-up performance and improvement of high-SV performance can be realized, to a higher level, within such ranges of the length of the first-stage coat layer and of the second-stage coat layer.

DESCRIPTION OF EMBODIMENTS

Preferred embodiments of the present invention will be explained next. Any features other than the features specifically set forth in the present description (for instance the composition and so forth of a porous carrier) and which may be necessary for carrying out the present invention (for instance, general features pertaining to the arrangement of exhaust gas purification catalysts) can be regarded as instances of design matter for a person skilled in the art on the basis of known techniques in the technical field in question. The invention can be realized on the basis of the disclosure of the present specification and common technical knowledge in the relevant technical field. In the explanation below, exhaust gas having a lean, stoichiometric or rich air-fuel ratio denotes exhaust gas having an air-fuel ratio similar to the air-fuel ratio of exhaust gas emitted from an internal combustion engine upon combustion of a lean, stoichiometric or rich mixed gas, respectively, in the internal combustion engine, or exhaust gas resulting from post-supply of a hydrocarbon to the above exhaust gas.

The exhaust gas purification catalyst disclosed herein contains a base and a catalyst coat layer formed on the surface of the base, the catalyst coat layer being formed as a multilayer structure.

Figure 1:
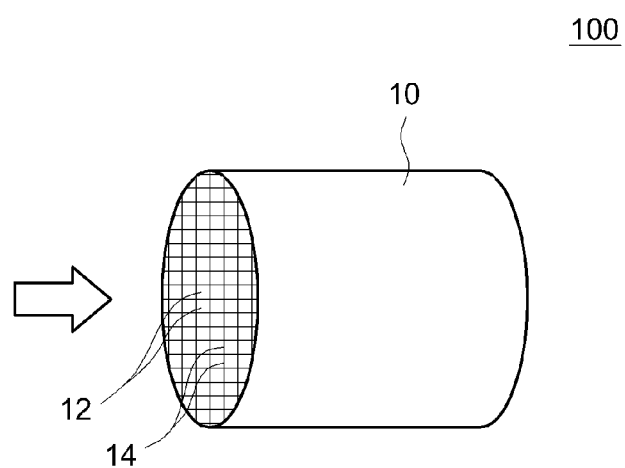
FIG. 1 is a schematic configuration explanatory diagram of an exhaust gas purification catalyst according to an embodiment of the present invention.

FIG. 1 is a schematic diagram of a typical example of an exhaust gas purification catalyst 100. The exhaust gas purification catalyst 100 according to the present embodiment is provided with a honeycomb base 10 having a plurality of regularly arrayed cells 12, and rib walls 14 for partitioning the cells 12.

As the base 10 that constitutes the exhaust gas purification catalyst 100 disclosed herein there can be used conventional bases of various materials and forms that are used in this kind of applications. For instance, a honeycomb base having a honeycomb structure formed from a ceramic such as cordierite, silicon carbide (SiC) or the like, or formed from an alloy (stainless steel or the like), can be suitably used herein. As an example, a honeycomb base having an external cylindrical shape is provided with through-holes (cells) as exhaust gas passages in the cylinder axis direction, such that exhaust gas can come into contact with partition walls (rib walls) that partition the respective cells. The shape of the base may be a foam shape, a pellet shape or the like, instead of a honeycomb shape. The outer shape of the base as a whole may be an elliptic cylinder shape, polygonal cylinder shape or the like, instead of a cylinder shape. In the present specification, the volume (capacity) of the base 10 refers to bulk volume, which encompasses the volume of voids (cells) in the interior in addition to the net volume of the base (i.e. including the catalyst coat layer formed inside these voids (cells)).

<Catalyst Coat Layer>

Figure 2:
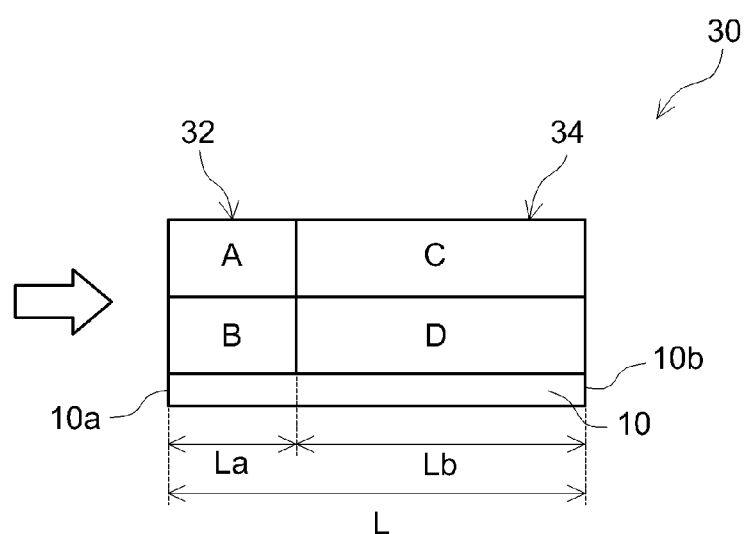
FIG. 2 is a diagram illustrating schematically the configuration of a rib wall portion in an exhaust gas purification catalyst according to an embodiment of the present invention.

FIG. 2 is a diagram illustrating schematically the configuration of a surface portion of a rib wall 14 of the honeycomb base 10 of FIG. 1. The rib walls 14 are provided with the base 10 and with a catalyst coat layer 30 formed on the surface of the base 10. In the art disclosed herein, the catalyst coat layer 30 is provided with rhodium (Rh) and palladium (Pd) as noble metal catalysts, and with an OSC material having oxygen storage capacity. The catalyst coat layer 30 is provided with a first-stage coat layer 32 positioned on the upstream side and with a second-stage coat layer 34 positioned on the downstream side, in the direction of exhaust gas flow. The first-stage coat layer 32 is provided with a first-stage lower layer B formed on the base 10 and with a first-stage upper layer A formed on the first-stage lower layer B. The second-stage coat layer 34 is provided with a second-stage lower layer D formed on the base 10, and with a second-stage upper layer C formed on the second-stage lower layer D. Herein Rh is disposed in the first-stage upper layer A of the first-stage coat layer 32 and in the second-stage upper layer C of the second-stage coat layer 34. Further, Pd is disposed in the first-stage upper layer A and the first-stage lower layer B of the first-stage coat layer 32, and in the second-stage lower layer D of the second-stage coat layer 34. A mass ratio ($A_{Pd}/A_{Rh}$) of Pd to Rh, disposed in first-stage upper layer A is $0.5 \leq (A_{Pd}/A_{Rh}) \leq 3$. As a result, better warm-up performance and higher SV performance can be realized than in conventional exhaust gas purification catalysts in which for instance Pd is disposed in the lower layer alone and Rh is disposed in the upper layer alone.

Conceivable reasons why such an effect is elicited include, although not particularly limited to, the following. Specifically, the purification reaction starts generally from the upstream side of the upper layer to which the temperature of exhaust gas is readily transmitted (i.e. starts from the first-stage upper layer A), during warm-up such as immediately after engine start-up. Accordingly, it is deemed that by shifting some Pd disposed on the upstream side of the lower layer (i.e. in the first-stage lower layer B) to the upstream side of the upper layer (i.e. to the first-stage upper layer A), Pd of high reactivity towards HC becomes disposed also in the first-stage upper layer A, and the HC purification performance during warm-up is enhanced. The mass ratio ($A_{Pd}/A_{Rh}$) of Pd to Rh, disposed in the first-stage upper layer A, suitably satisfies $0.5 \leq (A_{Pd}/A_{Rh})$. Herein there is preferably satisfied $0.7 \leq (A_{Pd}/A_{Rh})$, more preferably there is satisfied $0.8 \leq (A_{Pd}/A_{Rh})$ and particularly preferably there is satisfied $0.9 \leq (A_{Pd}/A_{Rh})$, for instance from the viewpoint of achieving a catalyst having yet better warm-up performance.

On the other hand, if the mass ratio ($A_{Pd}/A_{Rh}$) is excessively high, alloying of Pd and Rh due to sintering may occur in the first-stage upper layer A. Herein Pd exhibits excellent purification performance on olefinic HC, and Rh on paraffinic HC. In an exhaust gas purification catalyst where the mass ratio ($A_{Pd}/A_{Rh}$) is excessively high, oxygen in the first-stage upper layer A is preferentially used for purification of olefinic HC on Pd, and purification of paraffinic HC on Rh does not progress readily. As a result, HC purification performance during warm-up may rather drop in some instances. Moreover, Rh is poisoned by HC, and OSC reactions on Rh are inhibited. As a result, OSC capacity might drop at times of high SV (high exhaust gas flow rate). The mass ratio ($A_{Pd}/A_{Rh}$) is appropriately about 3 or lower, and preferably 2.6 or lower, (for instance 2.5 or lower), more preferably 2 or lower, and yet more preferably 1.5 or lower, for instance from the viewpoint of warm-up performance and high-SV performance. For instance, the mass ratio ($A_{Pd}/A_{Rh}$) may be 1.2 or lower. The art disclosed herein can be preferably implemented in an embodiment where for instance the mass ratio ($A_{Pd}/A_{Rh}$) of Pd to Rh, disposed in the first-stage upper layer A, lies in the range of 0.5 to 2.6 (for instance 0.55 to 2.6). That way, the ratio of Rh and Pd in the first-stage upper layer A strikes an appropriate balance, and accordingly the effect described above can be brought about more effectively.

In a preferred embodiment, a mass ratio of Pd to Rh, disposed in the first-stage coat layer 32 (i.e. the total of the first-stage upper layer A plus the first-stage lower layer B) and a mass ratio of Pd to Rh, disposed in the second-stage coat layer 34 (i.e. the total of the second-stage upper layer C plus the second-stage lower layer D) are identical. In other words, some of Pd disposed in the first-stage lower layer B is preferably shifted to the first-stage upper layer A, while evening out the overall Pd/Rh mass ratio in the first-stage coat layer 32 and the second-stage coat layer 34. Warm-up performance and high-SV performance can be realized thus to a yet higher level by shifting some of Pd disposed in the first-stage lower layer B to the first-stage upper layer A, while evening out the overall Pd/Rh mass ratio in the first-stage coat layer 32 and the second-stage coat layer 34.

<First-Stage Upper Layer A>

The first-stage upper layer A that constitutes the upper layer of the first-stage coat layer 32 disclosed herein contains Rh and Pd as noble metal catalysts, and an OSC material having oxygen storage capacity.

The OSC material works by storing oxygen from the exhaust gas when the air-fuel ratio of the exhaust gas is lean (i.e. oxygen excess atmosphere), and by releasing the stored oxygen when the air-fuel ratio in the exhaust gas is rich (i.e. fuel excess atmosphere). Examples of OSC materials include for instance cerium oxide (ceria: $CeO_2$), and a complex oxide containing ceria (for instance a ceria-zirconia complex oxide ($CeO_2$—$ZrO_2$ complex oxide)). A $CeO_2$—$ZrO_2$ complex oxide is preferably used among the OSC materials described above. By causing $ZrO_2$ to form a solid solution in $CeO_2$ it becomes possible to suppress grain growth of $CeO_2$ and to suppress drops in OSC capacity after endurance. The mixing proportion of $CeO_2$ and $ZrO_2$ in the $CeO_2$—$ZrO_2$ complex oxide may be $CeO_2/ZrO_2=0.1$ to $0.9$ (preferably 0.25 to 0.75, and more preferably about 0.25). High catalytic activity and high OSC (oxygen storage capacity) can be realized in the first-stage upper layer A containing Rh and Pd when $CeO_2/ZrO_2$ is set to lie within the above range.

Other compounds (typically inorganic oxides) may be mixed, as auxiliary components, into the $CeO_2$—$ZrO_2$ complex oxide. For instance, rare earth elements such as lanthanum, alkaline earth elements such as calcium, and transition metal elements can be used as such compounds. Among the foregoing, rare earth elements such as lanthanum are suitably used as a stabilizer, from the viewpoint of increasing the specific surface area at high temperature without hindering the catalytic function. For instance, rare earth oxides such as $La_2O_3$, $Y_2O_3$, $Pr_6O_{11}$ or the like may be mixed in, for instance, for the purpose of suppressing sintering. The rare earth oxide may be physically mixed, in the form of a single oxide, into a powder $CeO_2$—$ZrO_2$ complex oxide, or may be formulated as one component of the complex oxide. Preferably, the content ratio (mass ratio) of the auxiliary components is 2% to 30% (for instance 3% to 6%) with respect to the carrier as a whole. If the content ratio of the auxiliary component is excessively low, for instance the effects of sintering suppression is poor, while if the content ratio is too high, there decreases the amount of $ZrO_2$ and/or $CeO_2$, and heat resistance and OSC may drop as a result.

The content (mass) $A_{Ce}$ of $CeO_2$ disposed in the first-stage upper layer A is not particularly limited, but is appropriately about 5 g or greater, per L of volume of base. The content $A_{Ce}$ of $CeO_2$ is preferably 8 g or greater, more preferably 10 g or greater, and yet more preferably 15 g or greater, for instance from the viewpoint of increasing OSC capacity. The upper limit of the mass $A_{Ce}$ of $CeO_2$ disposed in the first-stage upper layer A is not particularly restricted, but is preferably 40 g or smaller, more preferably 30 g or smaller, yet more preferably 25 g or smaller, and particularly preferably 20 g or smaller, per L of volume of base. The art disclosed herein can be preferably implemented in an embodiment where for instance the mass $A_{Ce}$ of $CeO_2$ disposed in the first-stage upper layer A is 10 g to 20 g per L of volume of base.

The first-stage upper layer A disclosed herein may contain a material (non-OSC material) other than an OSC material. A porous metal oxide having excellent heat resistance is preferably used as the non-OSC material. Examples include for instance aluminum oxide (alumina: $Al_2O_3$), zirconium oxide (zirconia: $ZrO_2$) and the like. Among the foregoing $Al_2O_3$ is preferably used. Compared with an OSC material (for instance a $CeO_2$—$ZrO_2$ complex oxide), $Al_2O_3$ has a smaller specific surface area and higher durability (in particular, heat resistance). The thermal stability of the catalyst as a whole is increased as a result. The mass mixing ratio ($Al_2O_3$:OSC material) of $Al_2O_3$ and the OSC material lies preferably in the range of 80:20 to 20:80 (preferably in the range of 45:55 to 30:70). In such a configuration, the ratio between $Al_2O_3$ and OSC material strikes an appropriate balance, and hence this allows yet better bringing out the effect derived from mixing $Al_2O_3$ and the OSC material (for instance effect of combining the large specific surface area and high durability of $Al_2O_3$ with the oxygen storage/release capacity of the OSC material).

The Rh and Pd contained in the first-stage upper layer A disclosed herein are supported on at least one (for instance, on both) from among the OSC material and non-OSC material described above.

The content (mass) $A_{Pd}$ of Pd disposed in the first-stage upper layer A is not particularly limited, so long as it satisfies the above relationship with respect to the mass $A_{Rh}$ of Rh disposed in the first-stage upper layer A, but is appropriately about 0.005 g or greater per L of volume of base. The mass $A_{Pd}$ of Pd is preferably 0.01 g or greater, more preferably 0.02 g or greater, and yet more preferably 0.03 g or greater, for instance from the viewpoint of achieving a catalyst having yet better warm-up performance. The upper limit of the mass $A_{Pd}$ of Pd disposed in the first-stage upper layer A is not particularly restricted, but is preferably 1.5 g or smaller, more preferably 1 g or smaller, yet more preferably 0.5 g or smaller, and particularly preferably 0.3 g or smaller, per L of volume of base, for instance from the viewpoint of warm-up performance and high-SV performance. The art disclosed herein can be preferably implemented in an embodiment where for instance the mass $A_{Pd}$ of Pd disposed in the first-stage upper layer A is 0.04 g to 0.2 g per L of volume of base.

Preferably, a mass ratio ($A_{Pd}/B_{Pd}$) of Pd disposed in the first-stage upper layer A with respect to Pd disposed in the first-stage lower layer B satisfies $0.01 \le (A_{Pd}/B_{Pd})$, from the viewpoint of better bringing out the effect derived from arranging Pd in both the first-stage upper layer A and the first-stage lower layer B. The mass ratio ($A_{Pd}/B_{Pd}$) of Pd is preferably $0.05 \le (A_{Pd}/B_{Pd})$, yet more preferably $0.1 \le (A_{Pd}/B_{Pd})$ and particularly preferably $0.3 \le (A_{Pd}/B_{Pd})$, for instance from the viewpoint of achieving a catalyst having yet better warm-up performance. The mass ratio ($A_{Pd}/B_{Pd}$) of Pd is suitably lower than about 1, and is preferably 0.9 or lower, more preferably 0.8 or lower, yet more preferably 0.7 or lower, and particularly preferably 0.6 or lower, for instance from the viewpoint of warm-up performance and high-SV performance. For instance, a catalyst coat layer 30 in which the mass ratio ($A_{Pd}/B_{Pd}$) of Pd lies in the range of 0.1 to 0.8 (in particular 0.5 to 0.7) is preferable from the viewpoint of achieving both warm-up performance and high-SV performance at a high level.

In a preferred embodiment, A mass ratio ($A_{Pd}/A_{Ce}$) of Pd to $CeO_2$, disposed in the first-stage upper layer A, is about 0.005 or higher. The mass ratio ($A_{Pd}/A_{Ce}$) is preferably 0.01 or higher, more preferably 0.02 or higher, for instance from the viewpoint of increasing OSC capacity. The upper limit of the above quantity ratio ($A_{Pd}/A_{Ce}$) is not particularly restricted, but is suitably set to be about 0.1 or lower, and is preferably 0.06 or lower, more preferably 0.04 or lower, for instance from the viewpoint of warm-up performance and high-SV performance. The art disclosed herein can be preferably implemented in an embodiment where for instance the mass ratio ($A_{Pd}/A_{Ce}$) of Pd to $CeO_2$, disposed in the first-stage upper layer A, lies in the range of 0.01 to 0.06.

The density of Pd in the first-stage upper layer A (i.e. a value resulting from dividing the mass $A_{Pd}$ of Pd disposed in the first-stage upper layer A by a length La portion of the base) is not particularly limited, but is preferably 0.05 g/L or higher, more preferably 0.1 g/L or higher, and yet more preferably 0.14 g/L or higher, for instance from the viewpoint of achieving a catalyst having yet better warm-up performance. The density of Pd is preferably 3 g/L or lower, more preferably 2 g/L or lower, and yet more preferably 1 g/L or lower, for instance from the viewpoint of warm-up performance and high-SV performance.

The content (mass) $A_{Rh}$ of Rh disposed in the first-stage upper layer A is not particularly limited, so long as it satisfies the above relationship with respect to the mass $A_{Pd}$ of Pd disposed in the first-stage upper layer A, but is appropriately about 0.005 g or greater per L of volume of base. The mass $A_{Rh}$ of Rh is preferably 0.01 g or greater, more preferably 0.03 g or greater, yet more preferably 0.05 g or greater, and particularly preferably 0.07 g or greater, for instance from the viewpoint of achieving a catalyst having yet better warm-up performance. The upper limit of the mass $A_{Rh}$ of Rh disposed in the first-stage upper layer A is not particularly restricted, but is appropriately about 0.5 g or smaller per L of volume of base, and is preferably 0.3 g or smaller, more preferably 0.2 g or smaller, and yet more preferably 0.1 g or smaller, for instance from the viewpoint of warm-up performance and high-SV performance. The art disclosed herein can be preferably implemented in an embodiment where for instance the mass $A_{Rh}$ of Rh disposed in the first-stage upper layer A is 0.05 g to 0.1 g per L of volume of base.

The density of Rh in the first-stage upper layer A (i.e. value resulting from dividing the mass $A_{Rh}$ of Rh disposed in the first-stage upper layer A by a length La portion of the base) is not particularly limited, but is preferably 0.1 g/L or higher, more preferably 0.15 g/L or higher, yet more preferably 0.2 g/L or higher, and particularly preferably 0.25 g/L or higher, for instance from the viewpoint of achieving a catalyst having yet better warm-up performance. The density of Rh is preferably 3 g/L or lower, more preferably 2 g/L or lower, yet more preferably 1.5 g/L or lower, and particularly preferably 1 g/L or lower, for instance from the viewpoint of warm-up performance and high-SV performance.

The first-stage upper layer A disclosed herein may contain another noble metal catalyst, so long as the performance of Rh and Pd is not impaired thereby. Examples of noble metal catalysts other than Rh and Pd include for instance ruthenium (Ru), iridium (Ir), osmium (Os), platinum (Pt) and the like.

The forming amount (coating amount) of the first-stage upper layer A is not particularly limited, and is preferably for instance about 50 g to 200 g (typically 75 g to 150 g, for instance 90 g to 120 g) per L of volume of base. If the forming amount of the first-stage upper layer A is excessively small, the function of the first-stage upper layer A as a catalyst coat layer may be poor. If the forming amount of the first-stage upper layer A is excessively large, a concern arises in that pressure loss may increase during passage of exhaust gas through the cells of the base.

<First-Stage Lower Layer B>

The first-stage lower layer B that constitutes the lower layer of the first-stage coat layer 32 disclosed herein contains Pd as a noble metal catalyst, and a carrier that supports the Pd.

The content (mass) $B_{Pd}$ of Pd disposed in the first-stage lower layer B is not particularly limited, but is appropriately about 0.1 g or greater per L of volume of base. The mass $B_{Pd}$ of Pd is preferably 0.15 g or greater, more preferably 0.18 g or greater, yet more preferably 0.2 g or greater, and particularly preferably 0.25 g or greater, for instance from the viewpoint of achieving a catalyst having yet better warm-up performance. The upper limit of the mass $B_{Pd}$ of Pd disposed in the first-stage lower layer B is not particularly restricted, but is appropriately about 3 g or smaller per L of volume of base, and is preferably 2 g or smaller, more preferably 1 g or smaller, and yet more preferably 0.5 g or smaller, for instance from the viewpoint of warm-up performance and high-SV performance. The art disclosed herein can be preferably implemented in an embodiment where for instance the mass $B_{Pd}$ of Pd disposed in the first-stage lower layer B is 0.2 g to 0.4 g per L of volume of base.

The mass $B_{Pd}$ of Pd disposed in the disposed in the first-stage lower layer B, per L of volume of base, is preferably larger by 0.01 g or more, more preferably larger by 0.03 g or more, and yet more preferably larger by 0.05 g or more, than the mass $A_{Pd}$ of Pd disposed in the first-stage upper layer A. A value resulting from subtracting $A_{Pd}$ from $B_{Pd}$ (i.e. $B_{Pd}-A_{Pd}$) can be set for instance to be 1.5 g or smaller, and is preferably 1 g or smaller, more preferably 0.8 g or smaller, and yet more preferably 0.4 g or smaller. For instance, $B_{Pd}-A_{Pd}$ may be 0.35 g or smaller.

The density of Pd disposed in the first-stage lower layer B (i.e. a value resulting from dividing the mass $B_{Pd}$ of Pd disposed in the first-stage lower layer B by the volume of the base in the length La portion) is not particularly limited, but is preferably 0.1 g/L or higher, more preferably 0.3 g/L or higher, yet more preferably 0.5 g/L or higher, and particularly preferably 0.8 g/L or higher, for instance from the viewpoint of achieving a catalyst having yet better warm-up performance. The density of Pd in the first-stage lower layer B is preferably 3 g/L or lower, more preferably 2.5 g/L or lower, yet more preferably 2 g/L or lower, and particularly preferably 1.8 g/L or lower, for instance from the viewpoint of warm-up performance and high-SV performance. The density of Pd in the first-stage lower layer B may be for instance 1.5 g/L or lower.

The first-stage lower layer B disclosed herein may contain another noble metal catalyst, so long as the performance of Pd is not impaired thereby. Examples of noble metal catalysts other than Pd include for instance ruthenium (Ru), iridium (Ir), osmium (Os), platinum (Pt) and the like.

The carrier that supports the Pd in the first-stage lower layer B disclosed herein can contain an OSC material and/or non-OSC material. The same OSC materials and non-OSC materials explained regarding the first-stage upper layer A can be used herein as the OSC material and non-OSC material that the first-stage lower layer B may contain. The content of the $CeO_2$ and of the non-OSC material in the first-stage lower layer B can be set to be identical to those explained for the first-stage upper layer A.

The forming amount (coating amount) of the first-stage lower layer B is not particularly limited, and is preferably for instance about 50 g to 200 g (typically 75 g to 150 g, for instance 90 g to 120 g) per L of volume of base. If the forming amount of the first-stage lower layer B is excessively small, the function of the first-stage lower layer B as a catalyst coat layer may be poor. When the forming amount of the first-stage lower layer B is excessively large, a concern arises in that pressure loss may increase during passage of exhaust gas through the cells of the base.

In a preferred embodiment, the first-stage coat layer 32 is formed in a portion corresponding to at least 20% of the length (total length) L of the base 10 (at most 50%; i.e. there holds La=0.2L to 0.5L or preferably La=0.25L to 0.35L), from an exhaust gas inlet end (upstream end) 10*a* of the base 10 towards the exhaust gas outlet side (downstream side). In the example depicted in the figure, the first-stage coat layer 32 is formed in a portion (La=0.3L) corresponding to 30% of the total length L of the base 10, from the exhaust gas inflow end 10*a* of the base 10 towards the exhaust gas outlet side. By using as the first-stage coat layer 32 the portion of the base 10 corresponding to at least 20% (preferably 30%) of the total length L of the base 10, from the end 10*a* on the exhaust gas inlet side towards the exhaust gas outlet side, it becomes possible to increase effectively the warm-up performance of the catalyst, and to bring out yet more reliably high HC purification performance immediately after engine start-up.

<Second-Stage Upper Layer C>

The second-stage upper layer C that constitutes the upper layer of the second-stage coat layer 34 disclosed herein contains Rh as a noble metal catalyst, and a carrier that supports the Rh.

The content (mass) $C_{Rh}$ of Rh disposed in the second-stage upper layer C is not particularly limited, but is appropriately about 0.005 g or greater per L of volume of base. The mass $C_{Rh}$ of Rh is preferably 0.01 g or greater, more preferably 0.03 g or greater, yet more preferably 0.05 g or greater, and particularly preferably 0.07 g or greater, for instance from the viewpoint of achieving a catalyst having yet better warm-up performance. The upper limit of the mass $C_{Rh}$ of Rh disposed in the second-stage upper layer C is not particularly restricted, but is appropriately about 0.5 g or smaller per L of volume of base, and is preferably 0.3 g or smaller, more preferably 0.2 g or smaller, and yet more preferably 0.1 g or smaller, for instance from the viewpoint of warm-up performance and high-SV performance. The art disclosed herein can be preferably implemented in an embodiment where for instance the mass $C_{Rh}$ of Rh disposed in the second-stage upper layer C is 0.05 g to 0.1 g per L of volume of base.

A mass ratio ($D_{Pd}/C_{Rh}$) of Pd disposed in the second-stage lower layer D with respect to Rh disposed in the second-stage upper layer C is suitably set to about 2 or higher, from the viewpoint of better eliciting the effect derived from combining Rh and Pd. The mass ratio ($D_{Pd}/C_{Rh}$) is preferably 3 or higher, more preferably 5 or higher, and yet more preferably 5.5 or higher. The mass ratio ($D_{Pd}/C_{Rh}$) is suitably set to be about 20 or lower, and is preferably 15 or lower, more preferably 12 or lower, and yet more preferably 10 or lower. For instance, the mass ratio ($D_{Pd}/C_{Rh}$) may be 8 or lower. The art disclosed herein can be preferably implemented in an embodiment where for instance the mass ratio ($D_{Pd}/C_{Rh}$) of Pd disposed in the second-stage lower layer D with respect to Rh disposed in the second-stage upper layer C is 5 to 10. In such a configuration, the ratio between Rh and Pd in the catalyst coat layer as a whole strikes an appropriate balance, and hence the effect described above can be brought about more effectively.

The density of Rh in the second-stage upper layer C (i.e. value resulting from dividing the mass $C_{Rh}$ of Rh disposed in the second-stage upper layer C by the volume of the base in a length Lb portion) is not particularly limited, but is preferably 0.01 g/L or higher, more preferably 0.05 g/L or higher, yet more preferably 0.08 g/L or higher, and particularly preferably 0.1 g/L or higher, for instance from the viewpoint of achieving a catalyst having yet better warm-up performance. The density of Rh is preferably 2 g/L or lower, more preferably 1 g/L or lower, yet more preferably 0.5 g/L or lower, and particularly preferably 0.2 g/L or lower, for instance from the viewpoint of warm-up performance and high-SV performance. The density of Rh may be for instance 0.12 g/L or lower.

The second-stage upper layer C disclosed herein may contain another noble metal catalyst, so long as the performance of Rh is not impaired thereby. Examples of noble metal catalysts other than Rh include for instance ruthenium (Ru), iridium (Ir), osmium (Os), platinum (Pt) and the like.

The carrier that supports the Rh in the second-stage upper layer C disclosed herein can contain an OSC material and/or non-OSC material. The same OSC materials and non-OSC materials explained regarding the first-stage upper layer A can be used herein as the OSC material and non-OSC material that may be contained in the second-stage upper layer C. The content of $CeO_2$ and of the non-OSC material in the second-stage upper layer C can be set to be identical to those explained for the first-stage upper layer A.

The forming amount (coating amount) of the second-stage upper layer C is not particularly limited, and is preferably for instance about 50 g to 200 g (typically 75 g to 150 g, for instance 90 g to 120 g) per L of volume of base. If the forming amount of the second-stage upper layer C is excessively small, the function of the second-stage upper layer C as a catalyst coat layer may be poor. When the forming amount of the second-stage upper layer C is excessively large, a concern arises in that pressure loss may increase during passage of exhaust gas through the cells of the base.

<Second-Stage Lower Layer D>

The second-stage lower layer D that constitutes the lower layer of the second-stage coat layer 34 disclosed herein contains Pd as the noble metal catalyst, and a carrier that supports the Pd.

The content (mass) $D_{Pd}$ of Pd disposed in the second-stage lower layer D is not particularly limited, but is appropriately about 0.05 g or greater per L of volume of base. The mass $D_{Pd}$ of Pd is preferably 0.1 g or greater, more preferably 0.2 g or greater, yet more preferably 0.3 g or greater, and particularly preferably 0.4 g or greater, for instance from the viewpoint of achieving a catalyst having yet better warm-up performance. The upper limit of the mass $D_{Pd}$ of Pd disposed in the second-stage lower layer D is not particularly restricted, but is appropriately about 3 g or smaller per L of volume of base, and is preferably 2 g or smaller, more preferably 1 g or smaller, and yet more preferably 0.6 g or smaller, for instance from the viewpoint of warm-up performance and high-SV performance. The art disclosed herein can be preferably implemented in an embodiment where for instance the mass $D_{Pd}$ of Pd disposed in the second-stage lower layer D is 0.3 g to 0.6 g per L of volume of base.

The density of Pd in the second-stage lower layer D (i.e. a value resulting from dividing the mass $D_{Pd}$ of Pd disposed in the second-stage lower layer D by the volume of the base in the length Lb portion) is not particularly limited, but is preferably 0.05 g/L or higher, more preferably 0.1 g/L or higher, yet more preferably 0.3 g/L or higher, and particularly preferably 0.5 g/L or higher, for instance from the viewpoint of achieving a catalyst having yet better warm-up performance. The density of Pd is preferably 3 g/L or lower, more preferably 2 g/L or lower, yet more preferably 1.5 g/L or lower, and particularly preferably 1 g/L or lower, for instance from the viewpoint of warm-up performance and high-SV performance. The density of Pd may be for instance 0.8 g/L or lower.

The second-stage lower layer D disclosed herein may contain another noble metal catalyst, so long as the performance of Pd is not impaired thereby. Examples of noble metal catalysts other than Pd include for instance ruthenium (Ru), iridium (Ir), osmium (Os), platinum (Pt) and the like.

The carrier that supports the Pd in the second-stage lower layer D disclosed herein can contain an OSC material and/or non-OSC material. The same OSC materials and non-OSC materials explained regarding the first-stage upper layer A can be used herein as the OSC material and non-OSC material that may be contained in the second-stage lower layer D. The content of the $CeO_2$ and of the non-OSC material in the second-stage lower layer D can be set to be identical to those explained for the first-stage upper layer A.

The forming amount (coating amount) of the second-stage lower layer D is not particularly limited, and is preferably for instance about 50 g to 200 g (typically 75 g to 150 g, for instance 90 g to 120 g) per L of volume of base. If the forming amount of the second-stage lower layer D is excessively small, the function of the second-stage lower layer D as a catalyst coat layer may be poor. When the forming amount of the second-stage lower layer D is excessively large, a concern arises in that pressure loss may increase during passage of exhaust gas through the cells of the base.

In a preferred embodiment, the second-stage coat layer 34 is formed in a portion corresponding to at least 50% of the length (total length) L of the base 10 (at most 80%; i.e. there holds Lb=0.5L to 0.8L, preferably Lb=0.65L to 0.75L), from an exhaust gas outlet end (downstream end) 10b of the base 10 towards the exhaust gas inlet side (upstream side). In the example depicted in the figure, the second-stage coat layer 34 is formed in a portion (Lb=0.7L) corresponding to 70% of the total length L of the base 10, from the exhaust gas outlet end 10b of the base 10 towards the exhaust gas inlet side. The effect of the present embodiment can be better elicited by configuring the second-stage coat layer 34 in a portion of the base 10 corresponding to at least 50% (preferably at least 60%) of the total length L of the base 10, from the end 10b on the exhaust gas outlet side towards the exhaust gas inlet side.

<Method for Forming the Catalyst Coat Layer>

The catalyst coat layer 30 may be formed on the basis of respective different slurries for the first-stage upper layer A, the first-stage lower layer B, the second-stage upper layer C and the second-stage lower layer D. For instance, there may be prepared a slurry for first-stage upper layer formation, for forming the first-stage upper layer A, a slurry for first-stage lower layer formation, for forming the first-stage lower layer B, a slurry for second-stage upper layer formation, for forming the second-stage upper layer C, and a slurry for second-stage lower layer formation, for forming the second-stage lower layer D. The slurry for first-stage upper layer formation contains Pd and Rh, an OSC material, and other first-stage upper layer constituent components (for instance a non-OSC material). The slurry for first-stage lower layer formation contains Pd and other first-stage lower layer constituent components (for instance an OSC material and/or a non-OSC material). The slurry for second-stage upper layer formation contains Rh and other second-stage upper layer constituent components (for instance an OSC material and/or a non-OSC material). The slurry for second-stage lower layer formation contains Pd and other second-stage lower layer constituent components (for instance an OSC material and/or a non-OSC material). The slurry for first-stage lower layer formation and the slurry for second-stage lower layer formation are wash-coated onto the portions of the base 10 on which the first-stage lower layer B and the second-stage lower layer D are to be formed, to thereby form the first-stage lower layer B and the second-stage lower layer D on the surface of the base 10. Next, the slurry for first-stage upper layer formation and the slurry for second-stage upper layer formation are wash-coated onto the portions of the base 10 at which the first-stage upper layer A and the second-stage upper layer C are to be formed, to thereby form the first-stage upper layer A and the second-stage upper layer C on the first-stage lower layer B and the second-stage lower layer D. The catalyst coat layer 30 provided with the first-stage upper layer A, the first-stage lower layer B, the second-stage upper layer C and the second-stage lower layer D can thus be formed in the above manner. A binder may be incorporated into the slurries in order to cause the slurries to be brought properly into close contact with the base, in the process of forming the catalyst coat layer 30 by wash coating. For instance an alumina sol or silica sol is preferably used as the binder. The viscosity of the slurry may be adjusted as appropriate in such a manner that the slurries flow easily into the cells of the base (for instance a honeycomb base). The drying conditions of the slurries having been wash-coated onto the surface of the base 10 depend on the shape and dimensions of the base and/or the carrier, but typically involve about 80° C. to 300° C. (for instance 100° C. to 250° C.) for about 1 to 10 hours, and the firing conditions involve about 400° C. to 1000° C. (for instance 500° C. to 700° C.) for about 1 to 4 hours.

The exhaust gas purification catalyst 100 according to an embodiment of the present invention has been explained above, but the present invention is not limited to the above embodiment.

In the embodiments described above, for instance, the multilayer structure of the catalyst coat layer 30 includes the first-stage lower layer B and the second-stage lower layer D containing Pd, as lower layers close to the surface of the base 10, and the first-stage upper layer A containing Rh and Pd and the second-stage upper layer C containing Rh, as upper layers distant from the surface of the base 10, but the multilayer structure may be have three or more layers, including other layers, in addition to the above two layers. Further, the catalyst coat layer 30 need not have a vertical two-layer structure in which an upper layer and a lower layer extend over the entirety of the base (for instance a honeycomb base) 10, and part of the upper layer and part of the lower layer may have a partially stacked structure.

Test examples pertaining to the present invention will be explained below, but the invention is not meant to be limited to the matter illustrated in the test examples below.

Test Example 1

In the present example, there was produced an exhaust gas purification catalyst in which the ratio of coat widths of the first-stage coat layer 32 and the second-stage coat layer 34 was 30:70. The first-stage coat layer 32 is provided with the first-stage upper layer A and the first-stage lower layer B. The second-stage coat layer 34 is provided with the second-stage upper layer C and the second-stage lower layer D. In Comparative example 1 there was produced an exhaust gas purification catalyst in which Rh was disposed in the first-stage upper layer A and the second-stage upper layer C, and Pd was disposed in the first-stage lower layer B and the second-stage lower layer D. In Examples 1 to 3 and Comparative examples 2 and 3 there were produced exhaust gas purification catalysts in which some or all Pd disposed in the first-stage lower layer B in Comparative example 1 was shifted to the first-stage upper layer A. In Comparative examples 4 to 6 there were produced exhaust gas purification catalysts in which some or all Pd disposed in the second-stage lower layer D in Comparative example 1 was shifted to the second-stage upper layer C.

Specifically, a Pd nitrate solution and/or Rh nitrate solution, 40 g of alumina powder, 59 g of a $CeO_2$—$ZrO_2$ complex oxide ($CeO_2$: 3.1 g), 1 g of alumina sol and water were mixed to yield a slurry for first-stage lower layer formation. A portion of a monolith honeycomb base (volume 1 L) corresponding to 30% of the length L of the base, from the exhaust gas inflow end towards the downstream side, was wash-coated using the slurry for first-stage lower layer formation, with drying at 250° C. for 1 hour and firing at 500° C. for 1 hour, to thereby form the first-stage lower layer B.

A slurry for second-stage lower layer formation was obtained by mixing a Pd nitrate solution and/or Rh nitrate solution, 40 g of alumina powder, 59 g of a $CeO_2$—$ZrO_2$ complex oxide ($CeO_2$: 7.3 g), 1 g of alumina sol, and water. A portion of the monolith honeycomb base (volume 1 L) corresponding to 70% of the length L of the base, from the exhaust gas outflow end towards the upstream side, was wash-coated using the slurry for second-stage lower layer formation, with drying at 250° C. for 1 hour and firing at 500° C. for 1 hour, to thereby form the second-stage lower layer D.

A slurry for first-stage upper layer formation was obtained by mixing a Pd nitrate solution and/or Rh nitrate solution, 40 g of alumina powder, 59 g of $CeO_2$—$ZrO_2$ complex oxide ($CeO_2$: 3.1 g), 1 g of alumina sol, and water. A portion of the monolith honeycomb base (volume 1 L) corresponding to 30% of the length L of the base, from the exhaust gas inflow end towards the downstream side, was wash-coated using the slurry for first-stage upper layer formation, with drying at 250° C. for 1 hour and firing at 500° C. for 1 hour, to thereby form the first-stage upper layer A on the first-stage lower layer B.

A slurry for second-stage upper layer formation was obtained by mixing a Pd nitrate solution and/or Rh nitrate solution, 40 g of alumina powder, 59 g of a $CeO_2$—$ZrO_2$ complex oxide ($CeO_2$: 7.3 g), 1 g of alumina sol, and water. A portion of the monolith honeycomb base (volume 1 L) corresponding to 70% of the length L of the base, from the exhaust gas outflow end towards the upstream side, was wash-coated using the slurry for second-stage upper layer formation, with drying at 250° C. for 1 hour and firing at 500° C. for 1 hour, to thereby form the second-stage upper layer C on the second-stage lower layer D.

A respective exhaust gas purification catalyst of each example was thus produced in the manner above. Table 1 summarizes the mass $A_{Pd}$ of Pd and the mass $A_{Rh}$ of Rh disposed in the first-stage upper layer A, the mass $B_{Pd}$ of Pd disposed in the first-stage lower layer B, the mass $C_{Rh}$ of Rh disposed in the second-stage upper layer C, the mass $D_{Pd}$ of Pd disposed in the second-stage lower layer D, the $A_{Pd}/A_{Rh}$ mass ratio, and the mass ratio ($A_{Pd}/A_{Ce}$) of Pd to $CeO_2$, disposed in the first-stage upper layer A, for the exhaust gas purification catalysts of Examples 1 to 3 and Comparative examples 1 to 3.

TABLE 1

| | First-stage coat layer | | Second-stage coat layer | | | |
|---|---|---|---|---|---|---|
| | First-stage upper layer A | First-stage lower layer B | Second-stage upper layer C | Second-stage lower layer D | | |
| | Pd amount $A_{Pd}$ (g/unit) | Rh amount $A_{Rh}$ (g/unit) | Pd amount $B_{Pd}$ (g/unit) | Rh amount $C_{Rh}$ (g/unit) | Pd amount $D_{Pd}$ (g/unit) | $A_{Pd}/A_{Rh}$ | $A_{Pd}/A_{Ce}$ |
| Example 1 | 0.04 | 0.07 | 0.40 | 0.07 | 0.44 | 0.6 | 0.012 |
| Example 2 | 0.07 | 0.07 | 0.37 | 0.07 | 0.44 | 1.0 | 0.022 |
| Example 3 | 0.18 | 0.07 | 0.26 | 0.07 | 0.44 | 2.6 | 0.058 |
| Comparative example 1 | 0 | 0.07 | 0.44 | 0.07 | 0.44 | 0 | 0 |
| Comparative example 2 | 0.25 | 0.07 | 0.19 | 0.07 | 0.44 | 3.6 | 0.08 |
| Comparative example 3 | 0.44 | 0.07 | 0 | 0.07 | 0.44 | 6.3 | 0.14 |

Table 2 summarizes the mass $A_{Pd}$ of Pd and the mass $A_{Rh}$ of Rh disposed in the first-stage upper layer A, the mass $B_{Pd}$ of Pd disposed in the first-stage lower layer B, the mass $C_{Pd}$ of Pd and the mass $C_{Rh}$ of Rh disposed in the second-stage upper layer C, the mass $D_{Pd}$ of Pd disposed in the second-stage lower layer D, and the mass ratio ($c_{pd}/C_{Rh}$) of Pd to Rh, disposed in the second-stage upper layer c, for the exhaust gas purification catalysts of Comparative examples 4 to 6. A mass ratio ($A_{Pd}+B_{Pd})/A_{Rh}$ of Pd to Rh, disposed in the first-stage coat layer as a whole and the mass ratio $D_{Pd}/C_{Rh}$ of Pd to Rh, disposed in the second-stage coat layer as a whole are both 6.3.

TABLE 2

| | First-stage coat layer | | Second-stage coat layer | | | |
|---|---|---|---|---|---|---|
| | First-stage upper layer A | First-stage lower layer B | Second-stage upper layer C | | Second-stage lower layer D | |
| | Pd amount $A_{Pd}$ (g/unit) | Rh amount $A_{Rh}$ (g/unit) | Pd amount $B_{Pd}$ (g/unit) | Pd amount $C_{Pd}$ (g/unit) | Rh amount $C_{Rh}$ (g/unit) | Pd amount $D_{Pd}$ (g/unit) | $C_{Pd}/C_{Rh}$ |
| Comparative example 4 | 0 | 0.07 | 0.44 | 0.07 | 0.07 | 0.37 | 1.0 |
| Comparative example 5 | 0 | 0.07 | 0.44 | 0.25 | 0.07 | 0.19 | 3.6 |

TABLE 2-continued

| | First-stage coat layer | | Second-stage coat layer | | | |
| | First-stage upper layer A | | First-stage lower layer B | Second-stage upper layer C | | Second-stage lower layer D | |
| | Pd amount $A_{Pd}$ (g/unit) | Rh amount $A_{Rh}$ (g/unit) | Pd amount $B_{Pd}$ (g/unit) | Pd amount $C_{Pd}$ (g/unit) | Rh amount $C_{Rh}$ (g/unit) | Pd amount $D_{Pd}$ (g/unit) | $C_{Pd}/C_{Rh}$ |
|---|---|---|---|---|---|---|---|
| Comparative example 6 | 0 | 0.07 | 0.44 | 0.44 | 0.07 | 0 | 6.3 |

<Endurance Test>

An endurance test was performed on the exhaust gas purification catalysts of the examples. The exhaust gas purification catalyst of each example was arrayed in the exhaust system of an engine having a displacement of 4.6 L, the engine was run, and an endurance test was performed by holding a catalyst bed temperature of 1000° C. for 46 hours.

<Evaluation Test of Warm-Up Property>

Figure 3:
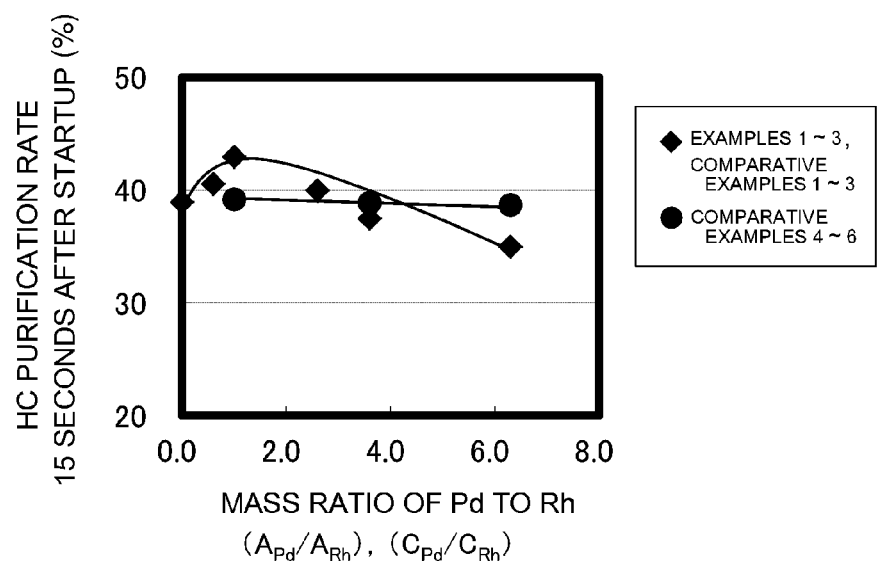
FIG. 3 is a graph illustrating the relationship between a mass ratio of Pd with respect to Rh, and HC purification rate.

Once the above endurance test was over, the exhaust gas purification catalyst of each example was attached to the exhaust system of an engine having a displacement of 2.4 L. Using a heat exchanger, exhaust gas at 520° C. was introduced into a sample in a state of catalyst temperature of 50° C., and the HC purification rate was measured 15 seconds after startup. The results are illustrated in FIG. 3. FIG. 3 is a graph illustrating the relationship between the mass ratios ($A_{Pd}/A_{Rh}$) and ($C_{Pd}/C_{Rh}$) of Pd with respect to Rh, and HC purification rate.

<OSC Evaluation Test at High SV>

Figure 4:
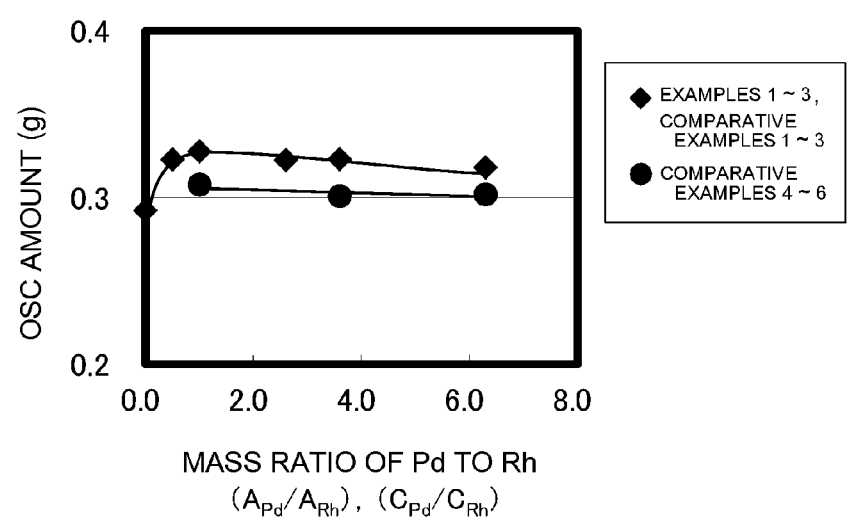
FIG. 4 is a graph illustrating the relationship between a mass ratio of Pd with respect to Rh, and OSC amount.

The oxygen absorption/release capacity (OSC) of the exhaust gas purification catalyst of each example was evaluated. Specifically, the exhaust gas purification catalyst after the endurance test was attached to the exhaust system of an engine having a displacement of 2.4 L. An $O_2$ sensor was attached downstream of each sample. Exhaust gas was caused to pass through the catalyst while under periodic switching, each predetermined time, between a rich and a lean air-fuel ratio A/F of a mixed gas that was supplied to the engine. Space velocity (SV) was set to about 40000 h$^{-1}$. An average oxygen absorption/release amount (OSC amount) of each exhaust gas purification catalyst was calculated on the basis of the behavior delay of the $O_2$ sensor. The results are illustrated in FIG. 4. FIG. 4 is a graph illustrating the relationship between the mass ratio ($A_{Pd}/A_{Rh}$) and ($C_{Pd}/C_{Rh}$) of Pd with respect to Rh and OSC amount.

As shown in FIGS. 3 and 4, Tables 1 and 2, the exhaust gas purification catalysts of Examples 1 to 3, in which of some of the Pd in the first-stage lower layer B was shifted to the first-stage upper layer A and the mass ratio ($A_{Pd}/A_{Rh}$) of Pd to Rh, disposed in the first-stage upper layer A, was set to lie in the range of 0.5 to 3, exhibited higher HC purification rate and better warm-up performance in the warm-up property evaluation test as compared with Comparative examples 1 to 6. The exhaust gas purification catalysts of Examples 1 to 3 had a greater OSC amount at high SV, and exhibited higher SV performance, than the catalyst of Comparative example 1, in which Pd was disposed only in the first-stage lower layer, and than the catalysts of Comparative examples 4 to 6, in which Pd in the second-stage lower layer D was shifted to the second-stage upper layer C. These results revealed that an exhaust gas purification catalyst, in which some Pd in the first-stage lower layer B is shifted to the first-stage upper layer A and the mass ratio ($A_{Pd}/A_{Rh}$) of Pd to Rh, disposed in the first-stage upper layer A, lies in the range of 0.5 to 3, allows achieving both warm-up performance and high-SV performance at a high level.

Test Example 2

Figure 5:
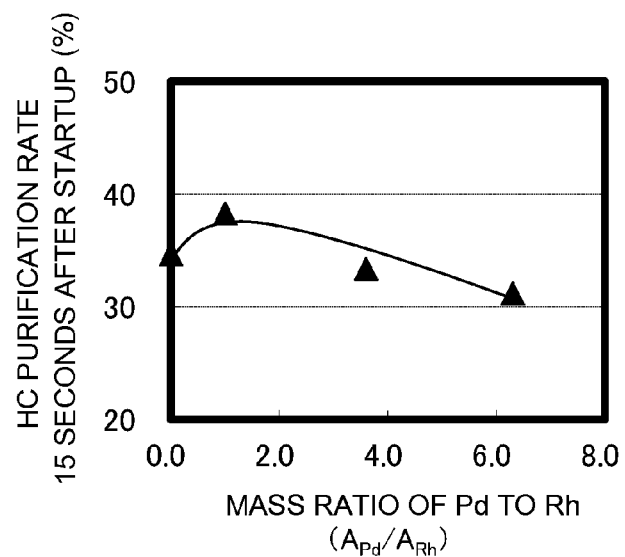
FIG. 5 is a graph illustrating the relationship between a mass ratio of Pd with respect to Rh, and HC purification rate.
Figure 6:
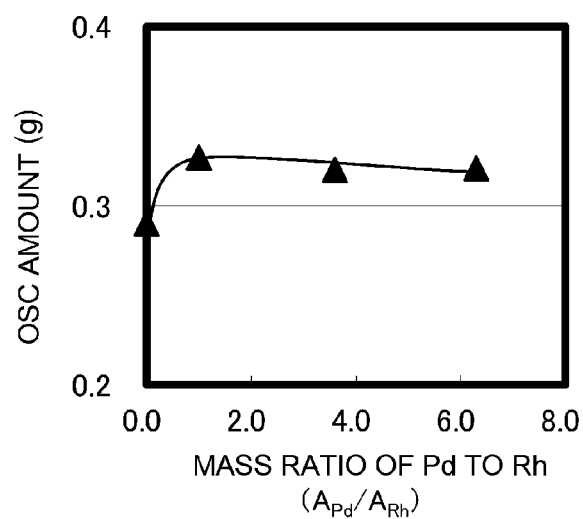
FIG. 6 is a graph illustrating the relationship between a mass ratio of Pd with respect to Rh, and OSC amount.

In the present example the following test was carried out in order to check the influence exerted on catalyst performance by the ratio of the coat widths of the first-stage coat layer and the second-stage coat layer. Specifically, an exhaust gas purification catalyst was produced by modifying the ratio of the coat widths of the first-stage coat layer (first-stage upper layer A and first-stage lower layer B) and of the second-stage coat layer (second-stage upper layer C and second-stage lower layer D) to 40:60, in the process of producing the exhaust gas purification catalysts of Example 2 and Comparative examples 1 to 3 described above. Warm-up property evaluation and OSC evaluation at high SV were carried out in accordance with the same procedure as in Test example 1. The results are illustrated in FIGS. 5 and 6. FIG. 5 is a graph illustrating the relationship between the mass ratio ($A_{Pd}/A_{Rh}$) of Pd with respect to Rh, and HC purification rate. FIG. 6 is a graph illustrating the relationship between the mass ratio ($A_{Pd}/A_{Rh}$) of Pd with respect to Rh, and OSC amount.

As shown in FIGS. 5 and 6, better results were obtained in a case where the mass ratio ($A_{Pd}/A_{Rh}$) of Pd to Rh, disposed in the first-stage upper layer A, was set to lie in the range of 0.5 to 3, also when the ratio of the coat widths of the first-stage coat layer and of the second-stage coat layer was modified to 40:60.

Concrete examples of the present invention have been explained in detail above, but the examples are merely illustrative in nature, and are not meant to limit the scope of the claims in any way. The art set forth in the claims encompasses various alterations and modifications of the concrete examples illustrated above.

INDUSTRIAL APPLICABILITY

The present invention allows providing an exhaust gas purification catalyst having excellent warm-up performance and good high-SV performance.

The invention claimed is:

1. An exhaust gas purification catalyst disposed in an exhaust passage of an internal combustion engine and purifying exhaust gas emitted by the internal combustion engine, the exhaust gas purification catalyst comprising a base and a catalyst coat layer formed on a surface of the base, wherein the catalyst coat layer is provided with Rh and Pd as noble metal catalysts, and with an OSC material having oxygen storage capacity;

the catalyst coat layer is provided with a first-stage coat layer positioned upstream and a second-stage coat layer positioned downstream, in a direction of exhaust gas flow;

the first-stage coat layer is provided with a first-stage lower layer formed on the base and with a first-stage upper layer formed on the first-stage lower layer;

the second-stage coat layer is provided with a second-stage lower layer formed on the base and a second-stage upper layer formed on the second-stage lower layer;

the Rh is disposed in the first-stage upper layer of the first-stage coat layer and in the second-stage upper layer of the second-stage coat layer;

the Pd is disposed in the first-stage upper layer and the first-stage lower layer of the first-stage coat layer, and in the second-stage lower layer of the second-stage coat layer; and a mass ratio ($A_{Pd}/A_{Rh}$) of Pd to Rh, disposed in the first-stage upper layer, is $0.5 \leq (A_{Pd}/A_{Rh}) \leq 1.2$.

2. The exhaust gas purification catalyst according to claim 1, wherein a mass ratio of Pd to Rh, disposed in the first-stage coat layer, and a mass ratio of Pd to Rh, disposed in the second-stage coat layer, are identical.

3. The exhaust gas purification catalyst according to claim 2, wherein a mass ratio ($A_{Pd}/B_{Pd}$) of Pd disposed in the first-stage upper layer with respect to Pd disposed in the first-stage lower layer is $0.1 \leq (A_{Pd}/B_{Pd}) \leq 0.7$.

4. The exhaust gas purification catalyst according to claim 2, wherein a mass ratio ($D_{Pd}/C_{Rh}$) of Pd disposed in the second-stage lower layer with respect to Rh disposed in the second-stage upper layer is $5 \leq (D_{Pd}/C_{Rh}) \leq 10$.

5. The exhaust gas purification catalyst according to claim 2, wherein the OSC material is composed of $CeO_2$ or a $CeO_2$—$ZrO_2$ complex oxide.

6. The exhaust gas purification catalyst according to claim 2, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

7. The exhaust gas purification catalyst according to claim 1, wherein a mass ratio ($A_{Pd}/B_{Pd}$) of Pd disposed in the first-stage upper layer with respect to Pd disposed in the first-stage lower layer is $0.1 \leq (A_{Pd}/B_{Pd}) \leq 0.7$.

8. The exhaust gas purification catalyst according to claim 7, wherein a mass ratio ($D_{Pd}/C_{Rh}$) of Pd disposed in the second-stage lower layer with respect to Rh disposed in the second-stage upper layer is $5 \leq (D_{Pd}/C_{Rh}) \leq 10$.

9. The exhaust gas purification catalyst according to claim 7, wherein the OSC material is composed of $CeO_2$ or a $CeO_2$—$ZrO_2$ complex oxide.

10. The exhaust gas purification catalyst according to claim 7, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

11. The exhaust gas purification catalyst according to claim 1, wherein a mass ratio ($D_{Pd}/C_{Rh}$) of Pd disposed in the second-stage lower layer with respect to Rh disposed in the second-stage upper layer is $5 \leq (D_{Pd}/C_{Rh}) \leq 10$.

12. The exhaust gas purification catalyst according to claim 11, wherein the OSC material is composed of $CeO_2$ or a $CeO_2$—$ZrO_2$ complex oxide.

13. The exhaust gas purification catalyst according to claim 11, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

14. The exhaust gas purification catalyst according to claim 1, wherein the OSC material is composed of $CeO_2$ or a $CeO_2$—$ZrO_2$ complex oxide.

15. The exhaust gas purification catalyst according to claim 14, wherein the OSC material is disposed in at least the first-stage upper layer; and a mass ratio ($A_{Pd}/A_{Ce}$) of Pd to $CeO_2$, disposed in the first-stage upper layer, is $0.01 (A_{Pd}/A_{Ce}) \leq 0.06$.

16. The exhaust gas purification catalyst according to claim 15, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

17. The exhaust gas purification catalyst according to claim 14, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

18. The exhaust gas purification catalyst according to claim 1, wherein the first-stage coat layer is formed in a portion, of the base, corresponding to at least 20% of the length of the base, from an end of the base on an exhaust gas inlet side towards an exhaust gas outlet side; and the second-stage coat layer is formed in a portion, of the base, corresponding to at least 50% of the length of the base, from an end of the base on the exhaust gas outlet side towards the exhaust gas inlet side.

* * * * *